United States Patent [19]

Kondo

[11] 4,395,100
[45] Jul. 26, 1983

[54] ILLUMINATION MODE SWITCHING CIRCUIT FOR AUTOMATIC ELECTRONIC FLASH

[75] Inventor: Isao Kondo, Hachioji, Japan

[73] Assignee: Olympus Optical Company Ltd., Tokyo, Japan

[21] Appl. No.: 389,039

[22] Filed: Jun. 16, 1982

Related U.S. Application Data

[63] Continuation of Ser. No. 173,051, Jul. 28, 1980, abandoned.

[30] Foreign Application Priority Data

Sep. 5, 1979 [JP] Japan .................................. 54-114672

[51] Int. Cl.³ .............................................. G03B 7/16
[52] U.S. Cl. .................................... 354/33; 354/60 F; 354/145
[58] Field of Search .................... 354/33, 60 F, 145

[56] References Cited

U.S. PATENT DOCUMENTS

| | | | |
|---|---|---|---|
| 4,078,242 | 3/1978 | Uchiyama et al. | 354/33 |
| 4,187,019 | 2/1980 | Uchiyama et al. | 354/145 |
| 4,280,760 | 7/1981 | Iwata et al. | 354/33 |

OTHER PUBLICATIONS

"Photographic Industries", p. 97, Nov. 1, 1978.

*Primary Examiner*—Russell E. Adams
*Attorney, Agent, or Firm*—Weinstein & Sutton

[57] ABSTRACT

An illumination mode switching circuit for an automatic electronic flash includes an illumination mode selecting, changeover switch having a first terminal which is utilized to establish an automatic illumination control level, a second terminal which provides a manual illumination control, and a third terminal which enables a full emission of flashlight from a flash discharge tube. An isolation diode is connected between the second and the third terminal. In this manner, any one of the three modes can be selected by operating the changeover switch.

11 Claims, 4 Drawing Figures

ILLUMINATION MODE SWITCHING CIRCUIT FOR AUTOMATIC ELECTRONIC FLASH

This is a continuation of application Ser. No. 173,051, filed July 28, 1980, now abandoned.

BACKGROUND OF THE INVENTION

The invention relates to an illumination mode switching circuit for an automatic electronic flash, and more particularly, to such a switching circuit which utilizes a single changeover switch to permit a selection among a plurality of different illumination modes available in an automatic electronic flash.

As is well recognized, an automatic electronic flash is mounted on a camera when in use includes a flash discharge tube, and the emission of light therefrom is automatically controlled in accordance with an output from a photoelectric transducer element which is provided within the electronic flash for purposes of photometry, when the latter is in its automatic illumination control mode. By changing a mode selecting, changeover switch, the electronic flash is capable of selecting any one of other modes, including a full illumination mode in which the electronic flash is permitted to provide a full emission of light, and a manual illumination control mode in which the emission of light from the electronic flash is controlled to a value which is one-half or one-quarter the full amount of emission, for example. In addition, when the automatic illumination control mode is selected, a number of automatic illumination control levels can be chosen in accordance with a diaphragm value of the taking lens of a camera. Furthermore, with an automatic electronic flash which can be connected with a single lens reflex camera having a photometric circuit of TTL (through the taking lens) photometry type, a TTL automatic illumination control mode is available in which the emission of light from the flash discharge tube is controlled in accordance with an output from the photoelectric transducer element provided on the part of the camera.

FIG. 1 is a block diagram illustrating the fundamental electrical circuit of an automatic electronic flash. It essentially comprises a power supply circuit 1, flashlight emission circuit 2 including a flash discharge tube, not shown, and a flashlight or illumination interrupting circuit 3 which operates to interrupt the emission of light from the flash discharge tube at a suitable time. The flashlight emission circuit 2 causes a flashlight to be emitted from the flash discharge tube in synchronized relationship with the full opening of a shutter in response to the closure of synchro contact X which is disposed within the camera. The illumination interrupting circuit 3 is connected with an illumination mode switching circuit 6, which includes a photometric integrating circuit 4 which is adapted to provide an automatic illumination control, and a time constant circuit 5 which is used to provide a manual illumination control. The integrating circuit 4 includes a photometric, photoelectric transducer element, not shown, which provides an automatic illumination control, and a changeover switch S3 which is used to establish an automatic illumination control level providing a proper exposure level when taking pictures in an automatic illumination control mode, in accordance with a diaphragm value, for example, F8, F5.6, F4 or the like of the taking lens of the camera. Integrating circuit 4 is connected to a fixed contact S2a of an illumination mode selecting, changeover switch S2. The time constant circuit 5 is formed by a well known capacitor-resistor timer circuit which controls the duration of illumination from the flash discharge tube. The circuit 5 is connected to another fixed contact S2c of the changeover switch S2. The changeover switch S2 includes a further fixed contact S2b which is left without circuit connection. The switch also includes a movable contact S2d, and when the movable contact is connected to the fixed contact S2b, the photometric integrating circuit 4 and the time constant circuit 5 are disabled. A TTL automatic illumination control mode selecting, changeover switch S1 is connected between the movable contact S2d of the changeover switch S2 and the illumination interrupting circuit 3, and includes a movable contact which may be thrown to either fixed contact S1a or another fixed contact S1b. When the movable contact is thrown to the fixed contact S1a, the illumination interrupting circuit 3 is connected to the changeover switch S2 while when the movable contact is thrown to the other fixed contact S1b, the illumination interrupting circuit 3 is connected to a photometric integrating circuit 7 which is provided within the camera to provide a TTL automatic illumination control.

In operation, the flash discharge tube emits flashlight, which is directed to an object being photographed. Reflective light L from the object is determined by the photometric integrating circuit 4. The changeover switch S2 which is used to select a particular illumination mode can be operated to select either one of an automatic illumination control mode in which the emission of light from the flash discharge tube is interrupted whenever a proper exposure is reached, a full illumination mode which permits a full emission of light from the tube, and a manual illumination control mode in which the emission of light from the tube is interrupted after a given time interval. In addition, the changeover switch S1 may be operated to select the TTL automatic illumination control mode. Additionally, the changeover switch S3 may be operated to choose one of automatic illumination control levels, thus permitting a proper exposure level to be selected when taking a picture in the automatic illumination control mode.

It will be seen that the automatic electronic flash mentioned above which permit a selection among a number of illumination modes utilizes a plurality of changeover switches S1-S3. In a conventional automatic electronic flash, the functioning of these changeover switches S1-S3 is provided by a multiple circuit, multiple contact rotary switch so that any one of the number of illumination modes can be selected through a single switch operation. However, the use of such a rotary switch presents difficulties in respect of the operational reliability, the cost of parts required and the ease of construction. As a consequence, the circuit arrangement of the illumination mode switching circuit becomes complex, accompanied by a complicated wiring to the switch and switch contacts, with the consequence that the overall reliability of the automatic electronic flash is reduced and its cost increased.

These disadvantages will be discussed in more detail with reference to FIG. 2 which illustrates one form of conventional illumination mode switching circuit. As shown, the circuit includes a ground potential bus E1 which is connected to a ground connection terminal G which is common with a camera. It also includes another bus E2 which is connected through a resistor R1 to a supply terminal Y which assumes a negative potential when the flash discharge tube emits flashlight. The photometric integrating circuit which provides an automatic illumination control, the time constant circuit utilized during a manual illumination control and illumination mode selecting, changeover switches are connected across the buses E1, E2. Specifically, connected across the buses E1, E2 are a parallel combination of a Zener diode ZD and a capacitor C1 which form together a power supply circuit for the illumination mode switching circuit, the photometric integrating circuit comprising a photometric, photoelectric transducer element PD, formed by a phototransistor, in series with a parallel combination of a resistor R2 and a capacitor C2, a variable resistor VR1 which is used to adjust a manual illumination control level, a series combination of a semi-fixed resistor VR2 and resistors R5, R6 and R7 which are used to establish automatic illumination control levels, and a time constant circuit comprising a parallel combination of a resistor R8 and capacitor C3 in series with a resistor R9.

The junction between the transducer element PD and resistor R2 is connected with fixed contacts a1–a3 of the illumination mode selecting, changeover switch SWa formed by a rotary switch. The switch SWa also includes a fixed contact a4 which is connected to the variable contact of the variable resistor VR1, and also includes other fixed contacts a5, a6 which are left without circuit connection. The movable contact a0 of the switch SWa is connected to the base of an NPN transistor Q1 through a resistor R3. The transistor Q1 operates to detect an illumination control level, and has its collector connected to the bus E1 through a resistor R4 and its emitter connected to the movable contact b0 of an automatic illumination control level selecting, changeover switch SWb which is formed by a rotary switch. The changeover switch SWb includes fixed contacts b1–b4, which are connected to the junction between the resistors R6, R7, the junction between the resistors R5, R6, the junction between the semi-fixed resistor VR2 and the resistor R5, and the junction between the resistors R8, R9, respectively. The switch SWb also includes fixed contacts b5, b6 which are left without circuit connection.

The collector of the transistor Q1 is connected to fixed contacts c1–c4 of a TTL automatic illumination control mode selecting, changeover switch SWc which is again formed by a rotary switch. The switch SWc inludes another fixed contact c5 which is left without circuit connection, and a further fixed contact c6 which is connected to a terminal, not shown, which is adapted to receive an automatic illumination control signal from the camera. The movable contact c0 of the changeover switch SWc is connected to an illumination control signal terminal T which is adapted to be connected to the illumination interrupting circuit.

Three changeover switches Swa, Swb and Swc are formed by a single rotary switch having three circuits and six contacts, and which constitutes an illumination mode selecting, changeover switch. By operating the switch to its successive positions, the movable contact of the changeover switch SWa can be thrown to successive fixed contacts a1–a6, the movable contact of the changeover switch SWb can be thrown to successive fixed contacts b1–b6, and the movable contact of the changeover switch SWc can be thrown to successive fixed contacts c1–c6, respectively.

Since the operation of the illumination mode switching circuit depends on the position of the respective changeover switches Swa, SWb and SWc, the operation will be described below with reference to individual positions of the changeover switches SWa, SWb and SWc.

(1) When the changeover switches SWa, SWb and SWc are thrown to respective fixed contacts a1, b1, c1, respectively:

In this instance, the base of the transistor Q1 is connected through the resistor R3 to the emitter of the transducer element PD, and the emitter of this transistor is connected to the junction between the resistors R6, R7 which are used to establish automatic illumination control levels. The collector of the transistor is connected to the terminal T which is in turn connected to the illumination interrupting circuit. In this manner, the photometric integrating circuit for automatic illumination control is formed.

When the synchro switch X is closed in response to the depression of a shutter button of camera, the flash discharge tube is allowed to emit flashlight, whereupon the terminal Y assumes a negative potential, thus back biasing the Zener diode ZD. In this manner, a given voltage is supplied across the buses E1, E2 for a given time interval. The flashlight from the discharge tube is reflected by an object being photographed, and impinges on the transducer element PD which is not activated for operation. Hence, the transducer element PD produces a photocurrent, which charges the integrating capacitor C2. When the voltage across the integrating capacitor C2 exceeds a threshold level of the transistor Q1 which depends on the magnitude of the resistor R7, and transistor Q1 is turned on, thus reducing or pulling the potential at the signal terminal T to the negative side to thereby activate the illumination interrupting circuit, thus interruping the emission of light from the flash discharge tube.

This provides an automatic illumination control mode in which a proper exposure is given when an increased value of diaphragm aperture, for example, F4, is chosen for the taking lens of the camera since the emission of light from the flash discharge tube is automatically interrupted when the transistor Q1 is turned on and since the threshold level of this transistor depends on the magnitude of the resistor R7.

(2) When the changeover switches SWa, SWb and SWc are thrown to respective fixed contacts a2, b2, c2, respectively:

The circuit connection is quite similar to that mentioned under paragraph (1) except that the level presetting resistors R6 and R7 are connected in series with the emitter of the transistor Q1. Hence, an automatic illumination control mode is provided in which a proper exposure is automatically established for an intermediate diaphragm value of the taking lens, for example. F5.6.

(3) When the changeover switches SWa, SWb and SWc are thrown to respective fixed contacts a3, b3 and c3, respectively:

The operation is similar to that mentioned under paragraph (1) except that level presetting resistors R5, R6 and R7 are connected in series with the emitter of the transistor Q1. Hence, an automatic illumination control mode is provided in which a proper exposure is established for a small diaphragm value of the taking lens, for example, F8.

(4) When the changeover switches SWa, SWb and SWc are thrown to respective fixed contacts a4, b4 and c4, respectively:

In this instance, the transistor Q1 has its base connected through the resistor R3 to the variable resistor VR1 which is used to adjust the manual illumination control level, its emitter connected to the junction between the resistors R8, R9 and its collector connected to the terminal T which is in turn connected to the illumination interrupting circuit. Hence, the photometric integrating circuit including the transducer element PD and whih provides the automatic illumination control is disconnected, while the time constant circuit is completed which provides the manual illumination control.

In this position of changeover switches, when the synchro switch X is closed in response to the depression of a shutter button of the camera, the flash discharge tube is allowed to emit flashlight, and an operating voltage is supplied across the buses E1, E2 for a given time interval. At the same time as the power supply across the buses E1, E2 is established, the time capacitor C3 begins to charge until the emitter potential of the transistor Q1 reduces below a given value over a given time interval, whereupon the transistor Q1 is turned on, driving the signal terminal to the negative to activate the illumination interrupting circuit, thus interrupting the emission of light from the flash discharge tube after it has emitted a given amount of flashlight. In this manner, the manual illumination control mode is provided in which a given proportion of light as referenced to the full emission of light from the flash discharge tube is emitted thereby.

(5) When the changeover switches SWa, SWb and SWc are thrown to respective fixed contacts a5, b5 and c5:

In this instance, the terminal T is disconnected from the illumination mode switching circuit, and hence the illumination interrupting circuit does not operate. Consequently, the emission of light from the discharge tube is not controlled, and a full emission of light is permitted. Accordingly, a manual full illumination mode is provided.

(6) When the changeover switches SWa, SWb and SWc are thrown to respective fixed contacts a6, b6 and c6:

In this instance, the illumination control signal terminal T is connected to a terminal which is adapted to receive an automatic illumination control signal from a photometric integrating circuit which is disposed in the camera to provide a TTL automatic illumination control. Accordingly, the illumination interrupting circuit operates in accordance with an automatic illumination control signal fed from the camera, thereby automatically interrupting the emission of light from the flash discharge tube. This provides the TTL automatic illumination control mode.

As discussed above, with the conventional illumination mode switching circuit shown in FIG. 2, a single rotary switch having three circuits and six contacts and which provides the function of the three changeover switches SWa, SWb, SWc may be operated to select one of the six illumination modes mentioned under paragraphs (1)–(6) above. However, the use of such rotary switch results in an increased cost which must be allowed to assure the operational reliability of switch itself. In addition, if the performance of the switch is assured, it remains to be complex. Such a rotary switch is very expensive itself, and requires a complex wiring therearound, whereby the cost of manufacturing an automatic electronic flash increases.

SUMMARY OF THE INVENTION

It is an object of the invention to eliminate the disadvantages of the conventional illumination mode switching circuit for an automatic electronic flash as mentioned above, by providing an illumination mode switching circuit for an automatic electronic flash which avoids the use of a multiple circuit, multiple contact switch and which permits a switching among a number of illumination modes through the operation of a single circuit, multiple contact switch of usual type by the provision of isolation diodes between a manual illumination control terminal and a full illumination terminal of the changeover switch.

In accordance with the invention, the use of a multiple circuit, multiple contact switch as used in the prior art is avoided. This permits a reduction in the cost of manufacturing an automatic electronic flash while improving its reliability.

A single circuit, multiple contact switch of the usual type may be effectively used in the present invention by merely requiring isolation diodes as added components. Hence, a complication in the circuit arrangement is avoided while permitting it to be implemented in an inexpensive manner.

The use of a simplified changeover switch results in a further simplification in the circuit arrangement, affording an increased freedom in the layout of parts, thus contributing to the reduction in the size of an automatic electronic flash.

DESCRIPTION OF PREFERRED EMBODIMENTS

Figure 3:
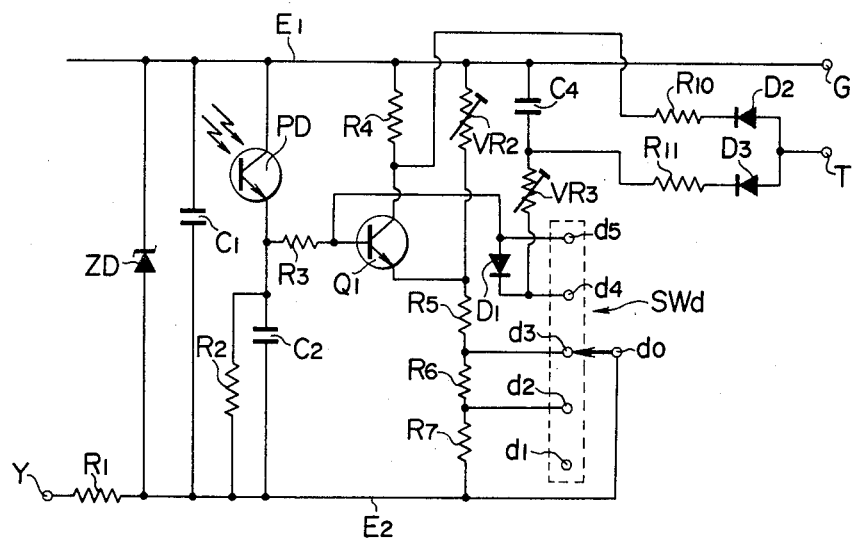
FIG. 3 is a circuit diagram of an illumination mode switching circuit for an automatic electronic flash which is constructed according to one embodiment of the invention.

FIG. 3 is a circuit diagram of an illumination mode switching circuit according to one embodiment of the invention. The switching circuit includes an illumination mode selecting, changeover switch SWd which is formed by a usual single circuit, five contact sliding changeover switch. The switch includes fixed contacts d1–d3 which are utilized to establish automatic illumination control levels. The contact d1 is left without circuit connection while contacts d2 and d3 are connected to the junction between level presetting resistors R6, R7 and to the junction between similar resistors R5, R6, respectively. The switch also includes another fixed contact d4 associated with the manual illumination control and which is connected to the bus E1 through a time constant circuit formed by a series combination of a capacitor C4 and a semi-fixed resistor VR3 which is used to adjust a manual illumination control level and which is also connected through an isolation diiode D1, poled reversely, to the base of an illumination control level detecting transistor Q1. The switch also includes a further fixed contact d5 which is connected to the junction between the isolation diode D1 and the base of the transistor Q1. The switch includes a movable contact d0 which is connected to the bus E2.

Figure 1:
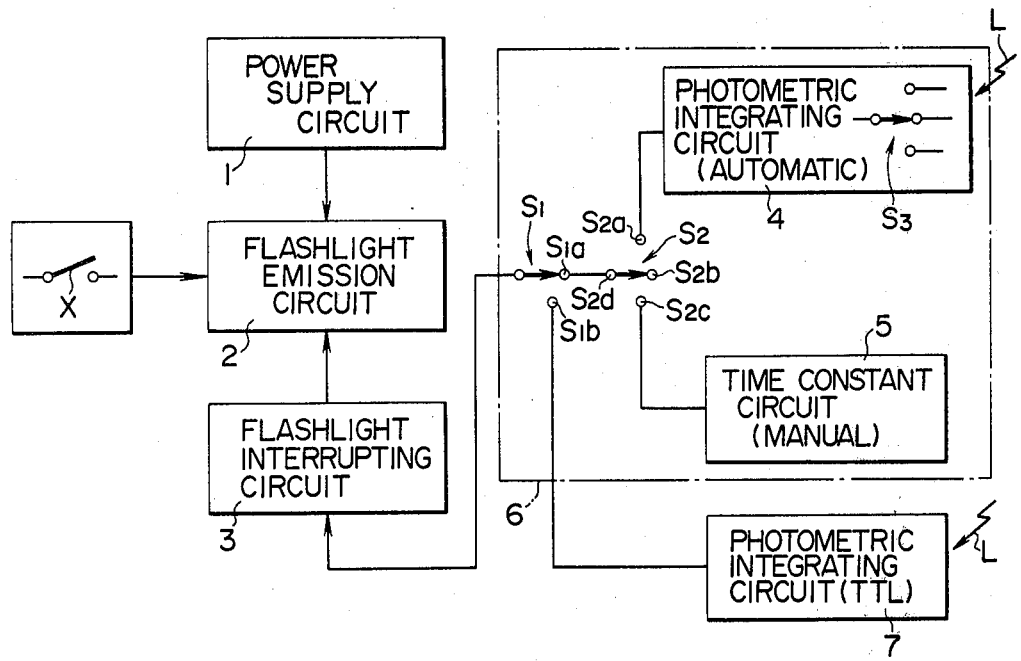
FIG. 1 is a block diagram of a fundamental electrical circuit of an automatic electronic flash.
Figure 2:
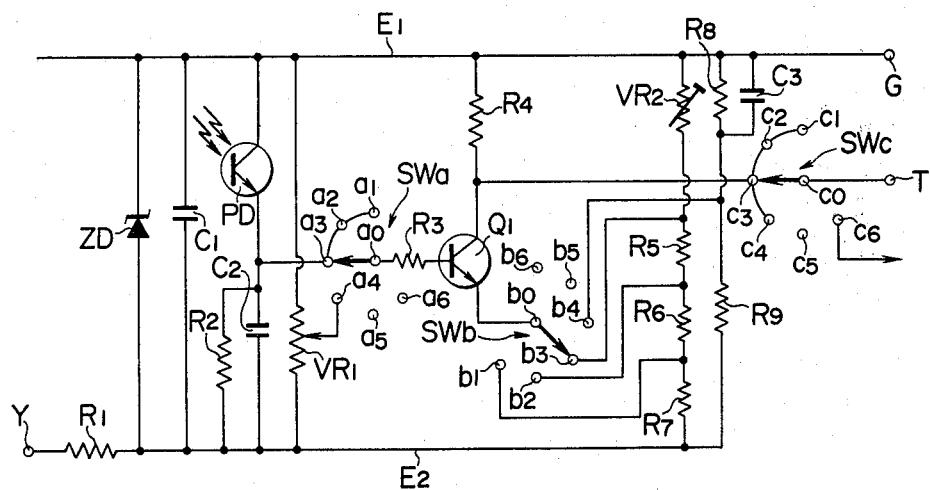
FIG. 2 is a circuit diagram of one form of a conventional illumination mode switching circuit associated with an automatic electronic flash.

The illumination control level detecting transistor Q1 has its base connected through the resistor R3 to the emitter of the photometric, photoelectric transducer element PD, and has its emitter connected to the junction between the semi-fixed resistor VR2 which is used to adjust the automatic illumination control level and the resistor R5 which is used to establish an automatic illumination control level. The collector of the transistor is connected to the terminal T through a series combination of a resistor R10 and a diode D2. The junction between the capacitor C4 and the semi-fixed resistor VR3 is also connected to the terminal T through a series combination of a resistor R11 and a diode D3. Other parts, not specifically referred to, correspond to these shown in FIG. 2, and are designated by like reference characters without describing their description.

In the illumination mode switching circuit shown, the changeover switch SWd is not provided with a fixed contact which is used to select the TTL automatic illumination control mode. This is because a switching to this mode can be achieved electrically without requiring a mechanical switch. The detailed connection therefor will not be specifically described since it has no direct bearing with the present invention.

The operation of the illumination mode switching circuit shown in FIG. 3 will now be described separately for each of the switching positions thereof.

(1) When the changeover switch SWd is thrown to fixed contact d1:

In this instance, the emitter of the transistor Q1 is connected to the bus E2 through resistors R5, R6, R7 which are used to establish automatic illumination control levels, so that the transistor Q1 is fed from the bus to form a photometric integrating circuit for the purpose of automatic illumination control.

The synchro switch X is closed in response to the depression of a shutter button of the camera to allow the flash discharge tube to emit flashlight. Thereupon, the bus E2 assumes a negative potential, and the power supply circuit comprising the Zener diode ZD and the capacitor C1 establishes a given voltage across the buses E1, E2 for a given time interval. Accordingly, the transducer element PD is activated and determines reflected light from an object being photographed. It produces a photocurrent corresponding to the amount of light which impinges thereon, and the photocurrent is integrated by the capacitor C2 until the voltage developed thereacross exceeds a threshold level of the transistor Q1 which depends on the resultant resistance presented by the resistors R5, R6, R7, whereupon the transistor is turned on, drawing the terminal T to a negative potential through the resistor R10 and diode D2. In this manner, the illumination interrupting circuit is activated to interrupt the emission of flashlight from the flash discharge tube.

Thus, when the changeover switch SWd is thrown to its fixed contact d1, the electronic flash assumes an automatic illumination control mode in which a proper exposure is obtained for a small diaphragm aperture of the taking lens of the camera, for example, F8.

(2) When the changeover switch SWd is thrown to its fixed contact d2:

The circuit arrangement is similar to that mentioned under paragraph (1) except that the emitter of the transistor Q1 is connected to the bus E2 through the resistors R5 and R6. Accordingly, the electronic flash assumes an automatic illumination control mode in which a proper exposure is obtained for an intermediate diaphragm value of the taking lens of the camera, for example, F5.6.

(3) When the changeover switch SWd is thrown to its fixed contact d3;

Again, the circuit arrangement is similar to that mentioned under paragraph (1) except that the emitter of the transistor Q1 is connected to the bus E2 through the resistor R5. Accordingly, the electronic flash assumes an automatic illumination control mode in which a proper exposure is obtained for a large diaphragm value of the taking lens of the camera, for example, F4.

(4) When the changeover switch SWd is thrown to its fixed contact d4:

At this time, the base of the transistor Q1 is connected to the bus E2 through the isolation diode D1, so that the transistor Q1 is cut off. As a consequence, a signal cannot be developed across the resistor R4 independently from the amount of light which impinges on the transducer element PD. Hence, an automatic illumination control signal is not derived at the terminal T. On the other hand, the series circuit including the capacitor C4 and the semi-fixed resistor VR3 is connected across the buses E1, E2 through the contacts d4 and d0, whereby a time constant circuit is formed which provides a manual illumination control.

With this circuit connection, when the synchro switch X is closed in response to the depression of the shutter button of the camera to allow the flash discharge tube to emit flashlight, the buses E1, E2 are energized. Hence, the time capacitor C4 begins to charge simultaneously, and when the junction between the capacitor C4 and the semi-fixed resistor VH3 assumes a given potential after a given time interval, that potential is transmitted, as an illumination control signal, through the resistor R11 and diode D3 to the signal terminal T. In response thereto, the illumination interrupting circuit is activated to interrupt the emission of flashlight from the flash discharge tube after it has produced a given amount of light.

Thus, when the changeover switch SWd is thrown to its fixed contact d4, the electronic flash assumes a manual illumination control mode in which the flash discharge tube supplies a given proportion of light with respect to the full emission of flashlight therefrom.

(5) When the changeover switch SWd is thrown to its fixed contact d5:

In this instance, the base of the transistor Q1 is connected to the bus E2, and hence the transistor is cut off. No illumination control signal is fed to the signal terminal T from the photometric integrating circuit. The isolation diode D1 blocks the time constant circuit including the capacitor C4 and the semi-fixed resistor VR3 from being formed, and hence no illumination control signal is fed to the signal terminal T from the time constant circuit. This means that the operation of the illumination interrupting circuit is inhibited, so that the flash discharge tube is allowed to provide a full emission of flashlight therefrom. In other words, the electronic flash assumes a full illumination mode.

As discussed above, in the illumination mode switching circuit of the present embodiment, the use of a single circuit, five contact switch and a single isolation diode permits any one of five illumination modes to be selected through a single switching operation, without requiring the use of a multiple circuit, multiple contact switch.

Figure 4:
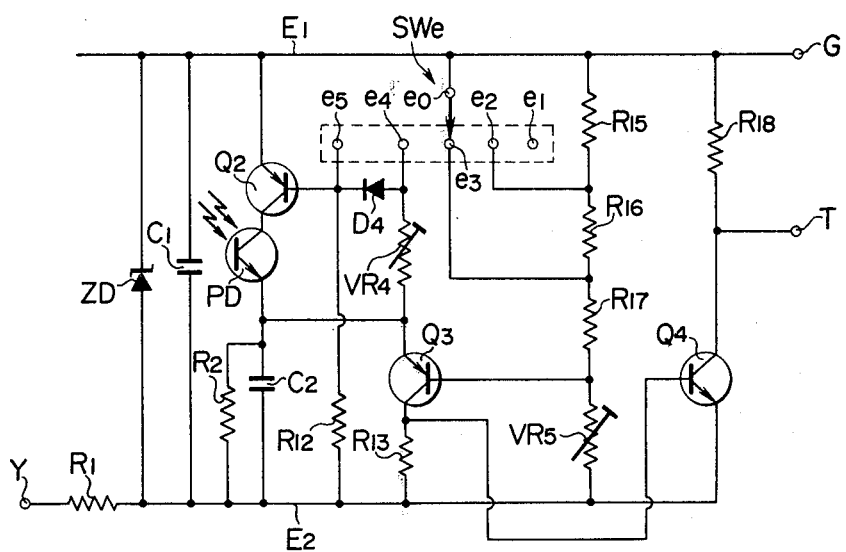
FIG. 4 is a circuit diagram of an illumination mode switching circuit according to another embodiment of the invention.

FIG. 4 shows another embodiment of the invention. In the illumination mode switching circuit of this embodiment, the bus E1 is connected to the ground potential terminal G which is common with the camera while the bus E2 is connected through resistor R1 with the power terminal Y which assumes a negative potential whenever the flash discharge tube emits flashlight. Connected across the buses E1, E2 are a parallel circuit including Zener diode ZD and capacitor C1 and forming a power supply circuit for the illumination mode switching circuit, a series circuit including a PNP transistor Q2 which operates as a switching element, a photometric, photoelectric transducer element PD formed by a phototransistor, and a parallel combination of resistor R2 and capacitor C2 which forms an integrator, another series circuit including resistors R15, R16, R17 which are used to establish automatic illumination control levels as well as a semi-fixed resistor VR5 which is used to adjust the automatic illumination control level, and a further series circuit including resistor R18 and an NPN transistor Q4 which operates as a switching element to derive an illumination control signal.

The transistor Q2 has its base connected to a fixed contact e5 of an illumination mode selecting, changeover switch SWe, which is used to provide a full emission of flashlight, and also connected through a resistor R12 to the bus E2. The base is also connected to the cathode of an isolation diode D4, the anode of which is connected to a fixed contact e4 of the switch SWe which provides a manual illumination control. The transistor Q2 has its emitter connected to the bus E1 and has its collector connected to the collector of the transducer element PD.

A series circuit including a semi-fixed resistor VR4 which is used to adjust a manual illumination control level, a PNP transistor Q3 which is used to detect the illumination control level, and a resistor R13 is connected between the fixed contact e4 of the switch SWe and the bus E2. The transistor Q3 has its emitter connected to the semi-fixed resistor VR4 and also to the emitter of the transducer element PD, and has its base connected to the junction between the resistor R17 and the semi-fixed resistor VR5. The collector of the transistor Q3 is connected to the base of the transistor Q4, which has its collector connected to an illumination control signal terminal T.

The illumination mode selecting, changeover switch SWe also includes fixed contacts e1 to e3, all of which are used to establish different automatic illumination control levels. It will be noted that the contact e1 is left without circuit connection. The contact e2 is connected to the junction between the resistors R15, R16 while the contact e3 is connected to the junction between the resistors R16, R17. The changeover switch SWe includes a movable contact e0 which is connected to the bus E1.

The operation of the illumination mode switching circuit shown in FIG. 4 will be described separately for each of the switching position of the changeover switch SWe.

(1) When the changeover switch SWe is thrown to its fixed contact e1:

In this instance, when the synchro switch X is closed in response to the depression of a shutter button of a camera to allow the flash discharge tube to emit flashlight, the bus E2 is energized to a negative potential, and the power supply circuit comprising Zener diode ZD and capacitor C1 supplies a given voltage across the buses E1, E2 for a given time interval. The transistor Q2 is therefore turned on and the transducer element PD is enabled for operation. Flashlight emitted by the flash discharge tube and reflected by an object being photographed impinges on the transducer element PD, which therefore produces a photocurrent corresponding to the amount of light received to thereby charge the capacitor C2. The integrated voltage across the capacitor C2 is applied across the emitter and collector of the illumination control level detecting transistor Q3. When the voltage exceeds a threshold level of the transistor Q3 which depends on the magnitude of the resultant resistance presented by the resistors R15, R16, R17, the transistor Q3 is turned on, which in turn turns the transistor Q4 on, thus applying an illumination control signal of a negative potential to the terminal T. This signal activates the illumination interrupting circuit, which automatically interrupts the emission of flashlight from the flash discharge tube.

Thus, when changeover switch SWe is thrown to its fixed contact e1, the electronic flash assumes an automatic illumination control mode in which a proper exposure is given for a large diaphragm value of the camera, for example, F4.

(2) When the changeover switch SWe is thrown to its fixed contact e2:

The circuit connection in this instance is similar to that mentioned under paragraph (1) except that the base of the transistor Q3 is connected to the bus E1 through resistors R17, R16. Hence, the electronic flash assumes an automatic illumination control mode in which a proper exposure is obtained for an intermediate diaphragm value of the taking lens of the camera, for example, F5.6.

(3) When the changeover switch SWe is thrown to its fixed contact e3:

Again, the circuit arrangement is similar to that mentioned under paragraph (1) except that the base of the transistor Q3 is connected to the bus E1 through resistor R17. Hence, the electronic flash assumes an automatic illumination control mode in which a proper exposure is obtained for a small diaphragm value of the taking lens of the camera, for example, F8.

(4) When the changeover switch SWe is thrown to its fixed contact e4:

In this instance, the isolation diode D4 short-circuits the base-emitter path of the transistor Q2, which is therefore cut off to disable the transducer element PD. Also, one end of the semi-fixed resistor VR4 is connected to the bus E1, so that the combination of the resistor VR4 and capacitor C2 forms a time constant circuit which provides a manual illumination control.

Under this condition, when the single switch X is closed in response to the depression of a shutter button of the camera to allow the flash discharge tube to emit flashlight, the buses E1, E2 are energized. Hence, the capacitor C2 begins to charge simultaneously, with the voltage developed thereacross being applied across the emitter-collector path of the transistor Q3. When the voltage exceeds the threshold level of the transistor Q3, the latter is turned on as is the transistor Q4, whereby an illumination control signal is applied to the terminal T. This activates the illumination interrupting circuit to terminate the emission of flashlight from the flash discharge tube.

In this manner, when the changeover switch SWe is thrown to its fixed contact e4, the electronic flash assumes a manual illumination control mode in which the flash discharge tube is allowed to emit a given proportion of light with respect to the full emission thereof.

(5) When the changeover switch SWe is thrown to its fixed contact e5:

The base-emitter path of the transistor Q2 is short-circuited and the transistor becomes cut off, whereby the transducer element PD is disabled. The isolation diode D4 prevents one end of the semi-fixed resistor VR4 from being connected to the bus E1, and hence the time constant circuit for the manual illumination control cannot be formed. Accordingly, the transistors Q3 and Q4 cannot be turned on, and as a result, the illumination interrupting circuit is not activated to terminate the emission of light from the flash discharge tube, which is therefore allowed to provide a full emission. Thus, the electronic flash assumes a full illumination mode.

In the both embodiments described above, during the automatic illumination control mode, the illumination levels can be changed over three steps. However, it should be understood that the number of such levels can be increased by providing an increased number of automatic illumination control level presetting resistors and an increased number of fixed contacts in the mode selecting changeover switch.

While in the embodiments described above, the illumination mode selecting changeover switch comprises a sliding switch having a single circuit and multiple contacts, it may be replaced by a rotary switch.

What is claimed is:

1. An illumination mode switching circuit for an automatic electronic flash which permits a selection among an automatic illustration control mode in which the emission of flashlight from a flash discharge tube is interrupted in response to an output from a photometric integrating circuit including a photoelectric transducer element, a manual illumination control mode in which the emission of flashlight from the flash discharge tube is interrupted with a time constant which is determined by a time constant circuit, and a full illumination mode in which a full emission of flashlight from the flash discharge tube is permitted; characterized by the provision of an illumination mode selecting changeover switch having a first terminal connected to an automatic illumination control level presetting circuit for selecting an automatic illumination control level, a second terminal for a manual illumination control which is connected to the time constant circuit and a third terminal for full emission which is connected to the photometric integrating circuit, and an isolation diode connected between the second and the third terminal, the arrangement being such that whenever the changeover switch is thrown to the second terminal, the photometric integrating circuit is disabled through the isolation diode while the time constant circuit is enabled to thereby select the manual illumination control mode, while whenever the changeover switch is thrown to its third terminal, the photometric integrating circuit is disabled and the time constant circuit is also disabled by the isolation diode to thereby select a full illumination mode.

2. An illumination mode switching circuit according to claim 1 in which the photometric integrating circuit includes a switching element which may be turned on or off to enable or disable the photometric integrating circuit.

3. An illumination mode switching circuit according to claim 1 in which the photometric integrating circuit includes an integrating capacitor which also serves as a timing capacitor of the time constant circuit.

4. An illumination mode switching circuit according to claim 1 in which the photometric integrating circuit and the time constant circuit are both connected to an illumination control level detecting transistor which, when turned on, provides an illumination control signal fed to an illumination control signal terminal, the illumination control signal having a same voltage level both during the automatic illumination control mode and during the manual illumination control mode.

5. An illumination mode switching circuit according to claim 1 in which the changeover switch comprises a single circuit, multiple contact sliding switch.

6. An illumination mode switching circuit according to claim 1 in which the changeover switch includes a plurality of first terminals which are utilized to preset automatic illumination control levels, whereby a plurality of automatic illumination control modes having different illumination control levels can be selected.

7. An illumination mode switching circuit according to claim 1 in which said changeover switch comprises a single circuit, multiple contact switch.

8. An illumination mode switching circuit for an automatic electronic flash for permitting selection among an automatic illumination control mode, a manual illumination control mode, and a full illlumination control mode, comprising:
an illumination mode selecting changeover switch having a first terminal connected to an automatic illumination control level presetting circuit for selecting one of a plurality of illumination control levels, a second terminal for a manual illumination control connected to a time constant circuit, and a third terminal for full emission connected to a photometric integrating circuit;
an isolation diode connected between said second terminal and said third terminal for disabling said photometric integrating circuit while enabling said time constant circuit when said changeover switch is moved to said second terminal to select said manual illumination control mode, and for disabling said photometric integrating circuit and disabling said time constant circuit when said changeover switch is moved to said third terminal to thereby select said full illumination mode.

9. An illumination mode switching circuit according to claim 8 in which said changeover switch comprises a single circuit, multiple contact switch.

10. An illumination mode switching circuit for an automatic electronic flash which permits a selection between an automatic illumination control mode in which the emission of flashlight from a flash discharge tube is interrupted in response to an output from a photometric integrating circuit including a photoelectric transducer element and a manual illumination control mode in which the emission of flashlight from the flash discharge tube is interrupted with a time constant which is determined by a time constant circuit, said illumination mode switching circuit comprising:
an illumination mode selecting changeover switch having a plurality of first terminals connected to an automatic illumination control level presetting circuit for selecting an automatic illumination control level and a second terminal for selecting a manual illumination control mode which is connected to the time constant circuit;

a transistor connected to the photoelectric transducer element;

an integrating capacitor connected to the photoelectric transducer element;

a diode connected to said transistor and to switching means;

a junction between the photoelectric transducer element and the integrating capacitor being connected to a junction between the switching means and the diode; and the arrangement being such that whenever the changeover switch is thrown to the second terminal, the photometric integrating circuit is disabled through said diode while the time constant circuit is enabled to thereby select the manual illumination control mode, and whenever the changeover switch is thrown to any of the first terminals, the photometric integrating circuit is enabled and the time constant circuit is disabled to thereby select an automatic illumination control mode.

11. An illumination mode switchng circuit according to claim 10 wherein said integrating capacitor also serves as a timing capacitor of said time constant circuit.

* * * * *

UNITED STATES PATENT AND TRADEMARK OFFICE
CERTIFICATE OF CORRECTION

PATENT NO. : 4,395,100

DATED : July 26, 1983

INVENTOR(S) : Isao Kondo

It is certified that error appears in the above-identified patent and that said Letters Patent is hereby corrected as shown below:

Column 4, line 26, "not" should read -- now --.

Signed and Sealed this

Eleventh Day of October 1983

[SEAL]

Attest:

Attesting Officer

GERALD J. MOSSINGHOFF

Commissioner of Patents and Trademarks